March 2, 1948.    C. H. DUTROW    2,437,223
SPORTSMAN'S COAT
Filed Dec. 13, 1945
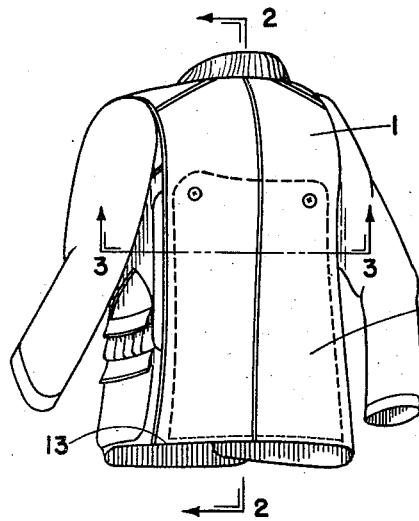
FIG. 1
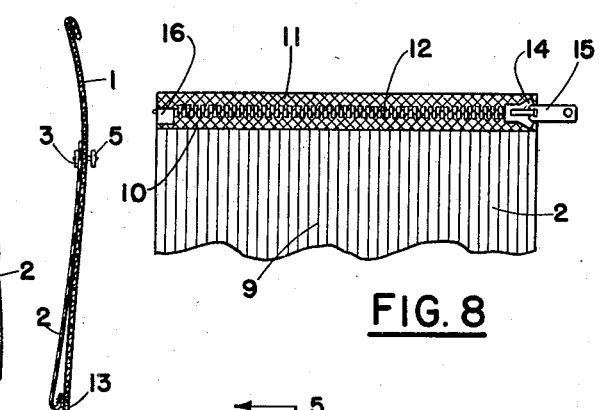
FIG. 2   FIG. 8
FIG. 3
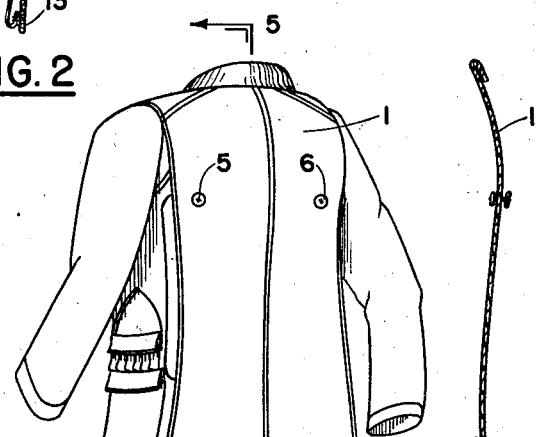
FIG. 4   FIG. 5
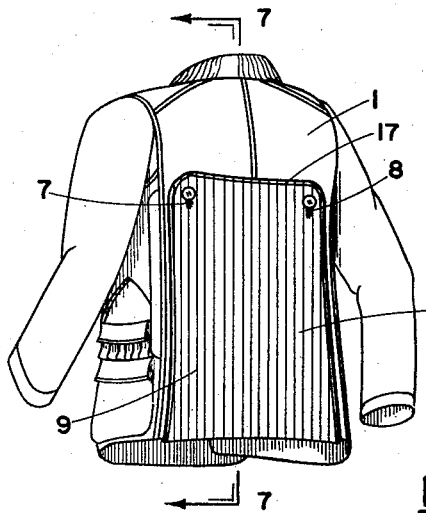
FIG. 6   FIG. 7
Inventor
CLAUDE H. DUTROW
By John B. Brady
Attorney Patented Mar. 2, 1948

2,437,223

UNITED STATES PATENT OFFICE 2,437,223

SPORTSMAN'S COAT

Claude H. Dutrow, Frederick, Md.

Application December 13, 1945, Serial No. 634,633

7 Claims. (Cl. 2—94)

My invention relates broadly to apparel, and more particularly to a novel form of sportsman's coat.

One of the objects of my invention is to provide an improved construction of sportsman's coat having an attachment thereon which may be folded in either of three positions in relation to the coat to serve as a signal for readily identifying the sportsman, or to serve as a protective shield for the sportsman, or to be stored in a position wholly within the coat.

Still another object of my invention is to provide a construction of contrastingly colored signal attachment for a sportsman's coat which may be readily folded to a stored position within the coat, or permitted to pendently hang from the coat to serve as a protective means when the sportsman wishes to sit down, in combination with fastening means for maintaining the attachment in any one of the selected positions.

Other and further objects of my invention reside in novel means of attachment for a signal, and protective seat for a sportsman's coat set forth more fully in the specification hereinafter following by reference to the accompanying drawing, in which:

Figure 1 is a perspective view of a sportsman's coat illustrating the signal and protective attachment of my invention in stored position; Fig. 2 is a vertical sectional view taken substantially on line 2—2 of Figure 1 showing the signal and protective attachment stored within the coat; Fig. 3 is a fragmentary transverse sectional view taken substantially on line 3—3 of Figure 1; Fig. 4 is a perspective view of the sportsman's coat illustrating the signal and protective attachment dropped to a pendently hanging position for the protection of the sportsman in a seated position; Fig. 5 is a vertical sectional view taken substantially on line 5—5 of Fig. 4; Fig. 6 is a perspective view of the sportsman's coat with the attachment fastened in position exteriorly of the coat and serving as a signal; Fig. 7 is a vertical sectional view taken substantially on line 7—7 of Fig. 6, and Fig. 8 is a fragmentary view showing a modified method of connecting the signal and protective attachment to the sportsman's coat.

My invention is directed to a sportsman's coat having connected thereto an attachment comprising a signal and protective means formed from rubber or other waterproof material fastened to the bottom of the back of the sportsman's coat. The rubber or waterproof material is sufficiently flexible so that the attachment may be folded into the rear of the sportsman's coat and stored and fastened therein by suitable buttons in such a manner that it is substantially unobservable. The attachment may be released from a position within the coat and permitted to pendently hang from the rear of the coat to form protection to the sportsman's clothing when the sportsman is in a forest, field, boat, or along the banks of a stream and wishes to sit down upon a stump, the ground, a wet boat seat, or wet rocks.

The protective and signal attachment is formed from material of bright contrasting color with respect to the sportsman's coat so that when the attachment is fastened outside of the coat it serves as a signal readily distinguishing the sportsman. The conventional sportsmen's coats are usually a light brown, or a yellowish, or a khaki color very similar to the natural color of autumn leaves. It is not unusual for a sportsman to be so camouflaged by the similarly colored leaves that his movements may attract the shots of fellow sportsmen. Under such circumstances it is almost impossible to detect a sportsman at a distance in the woods and accidents and casualties have occurred where fellow sportsmen have been led to believe that a distant sportsman might be the game they were stalking. By providing the attachment of my invention with a contrasting color, such as, red sheet-like material, such color readily stands out through the leaves and forms a warning signal to the fellow sportsmen of the identity of the sportsman. Thus the sheet-like signal conveniently buttoned over the back of the sportsman's coat furnishes very valuable protection to the sportsman in the course of the hunt. When the hunt is over the sheet-like signal is unbuttoned from the exterior of the back of the coat and is folded inside the coat and buttoned interiorly thereof so as not to attract attention when not in use.

Referring to the drawings in detail, reference character I designates the conventional sportsman's coat having the signal and protective attachment 2 of my invention stitched to the inside of the lower peripheral edge 13 thereof. In Figure 1 the signal or protective attachment 2 is illustrated in dotted lines, inasmuch as it is folded interiorly of the sportsman's coat and is fastened therein by the engagement of suitable fastening means carried by the sheet-like signal or attachment 2 with fastening means carried by the interior of the sportsman's coat. In the form of my invention as illustrated herein, the sheet-like signal or protective attachment 2 is provided with button holes which engage over buttons 3 and 4 sewed interiorly of the coat slightly below the shoulder portion thereof. In lieu of button holes and buttons I may employ spring snap fasteners of various forms.

The exterior of the back of the coat 1 is also provided with fastening means which coact with the fastening means carried by the sheet-like signal or protective attachment and are aligned therewith. In the form of my invention illustrated buttons 5 and 6 are arranged at spaced positions on the exterior of the rear of the coat 1 substantially in alignment with the shoulder portions of the coat. Buttons 5 and 6 engage the same button holes 7 and 8 which are engaged by buttons 3 and 4 when the signal or protective attachment 2 is folded interiorly of the coat.

As shown in Fig. 2, the signal or protective attachment 2, when released from the buttons 3 and 4 interiorly of the coat, is permitted to pendently hang from the bottom 13 of the coat. With the sheet-like signal or protective attachment pendently hanging from the bottom 13 of the sportsman's coat, the attachment serves as a protective means for the sportsman in sitting position on the seat of a boat—as required in duck or bird shooting; or in sitting upon a wet stump or log in the forests or fields when resting in a game hunt, or while sitting upon damp rocks along the banks of a stream. The attachment 2 illustrated in Figs. 4 and 5 also serves as a protection to the sportsman against rain and wind.

In the course of the hunt the signal or protective attachment is folded outside of the sportsman's coat 1 in the position illustrated in Figs. 6 and 7. It will be seen that the fastening means, such as the button holes 7 and 8 in the sheet-like signal or protective attachment are fastened over the buttons 5 and 6 thereby supporting the signal or protective attachment in a position whereby the contrasting color of the signal or protective attachment 2 represented by the surface lines 9 extends across substantially the entire back of the coat. Thus the identity of the sportsman is clearly established through the natural camouflage of the environment.

As represented in Fig. 8, the signal or protective attachment 2 carrying the contrasting colored surface 9 thereon is provided with a stitched fabric strip 10 extending transversely of the top thereof. A coacting transverse extending stitched strip 11 is provided on the bottom periphery 13 of the sportsman's coat. The coacting stitched strips 10 and 11 are interconnected by a zipper represented at 12 having an operating slide 14 and manual control device 15 connected thereto. A starting or zipper guide member 16 is provided adjacent the remote ends of the strips 10 and 11 to enable the zipper slide 14 to be gripped over the coacting zipper teeth represented at 12 for fastening the signal or protective attachment 2 to the sportsman's coat. The zipper provides a cover means for attaching or detaching attachment 2 to the sportsman's coat in lieu of the permanent stitching thereof to the coat as illustrated in Figs. 1–7. Thus, attachment to existing sportsman's coat is facilitated as compared to the original installation of the signal or protective attachment in the sportsman's coat as it is originally tailored.

The signal or protective attachment 2 is formed from flexible sheet-like rubber or waterproof material having a suitable binding edging which I have represented at 17 for preventing fraying of the edge.

Throughout the specification I have referred generally to a sportsman's coat. It will be understood that I have used this term synonymously to identify hunters, fishermen, and those generally engaged in sports or undertakings where an identifying signal is desirable at times but where the garment must perform several functions and where the garment may be restored to a condition for normal wear without visibility of the warning signal and protective device of my invention as described herein.

While I have described my invention in a preferred embodiment which I have found very practical and successful in production and use, I realize that modifications in the illustrated arrangement may be employed and I desire that it be understood that I intend no limitations upon my invention other than may be imposed by the scope of the appended claims.

What I claim as new and desire to secure by Letters Patent of the United States is as follows:

1. In a sportsman's coat, a back and shoulder portion, a flexible waterproof sheet of material having a width substantially conforming with the width of the back portion of the coat and connected with the lower rear edge of the back portion of the coat and foldable to a position either interiorly or exteriorly of the back portion of the coat, fastening means carried both interiorly and exteriorly of the back portion of the coat and substantially aligned one with the other, and means carried by the flexible waterproof sheet of material and alternately engageable with said fastening means for maintaining said sheet of material either interiorly or exteriorly of back portion of the coat.

2. In a sportsman's coat, a back and shoulder portion, a flexible waterproof sheet of material having a width substantially conforming with the width of the back portion of the coat and connected with the lower rear edge of the back portion of the coat and pendently supportable in a hanging position substantially coplanar with the back portion of the coat, said flexible waterproof sheet of material being foldable adjacent the interior of the back portion of the coat or alternately being foldable adjacent the exterior of the back portion of the coat, fastening means secured to both the inside and outside of the back portion of the coat and coacting means carried by said flexible waterproof sheet of material and detachably engageable with said fastening means for maintaining said sheet of material either inside or outside of the coat.

3. In a sportsman's coat, a back and shoulder portion, a flexible waterproof sheet of material having a width substantially conforming with the width of the back portion of the coat and connected with the lower rear edge of the back portion of the coat and pendently supportable in a hanging position substantially coplanar with the back portion of the coat, said flexible waterproof sheet of material being foldable adjacent the interior of the back portion of the coat or alternately being foldable adjacent the exterior of the back portion of the coat, fastening means secured to both the inside and outside of the back portion of the coat and coacting means carried by said flexible waterproof sheet of material and detachably engageable with said fastening means for maintaining said sheet of material either inside or outside of the coat, the surface of said flexible waterproof sheet of material that is exposed at the back portion of the coat being optically treated to establish a contrasting color signal distinguishing from the material of the coat and the environment in which it is normally used.

4. Apparel of the class described comprising a coat having a back and shoulder portion, a flexible sheet of waterproof material substantially conforming with the width of the back portion of the coat, means for detachably connecting said flexible sheet of waterproof material to the bottom edge of the back portion of the coat for permitting said flexible waterproof sheet of material to pendently hang from the back portion of the coat substantially coplanar with the back portion of the coat, fastening means disposed both interiorly and exteriorly of the back portion of the coat approximately in alignment with the shoulder portion of the coat and means carried by said flexible waterproof sheet of material for alternately engaging the fastening means interiorly of the back portion of the coat or the fastening means exteriorly of the coat whereby said flexible sheet of waterproof material may be concealed within the back portion of the coat or exposed exteriorly of the back portion of the coat adjacent the shoulder portion thereof.

5. Apparel of the class described comprising a coat having a back and shoulder portion and having a flexible waterproof sheet of material connected with the bottom edge of the back portion of the coat and adapted to pendently hang therefrom, said sheet of material having such length that when folded back upon said coat, either interiorly or exteriorly thereof, the upper edge extends substantially in alignment with the shoulder portion of the coat, fastening means disposed both interiorly and exteriorly of the coat and coacting fastening means carried by said flexible waterproof sheet of material and engageable with the aforesaid fastening means for maintaining the flexible waterproof sheet of material in a position concealed interiorly of the coat or in a position exposed exteriorly of the coat to constitute a signal.

6. Apparel of the class described comprising a coat having a back and shoulder portion and having a flexible waterproof sheet of material substantially conforming with the width of the back portion of the coat and connected with the bottom edge of the back portion of the coat and adapted to pendently hang therefrom, said sheet of material having such length that when folded back upon said coat, either interiorly or exteriorly thereof, the upper edge extends substantially in alignment with the shoulder portion of the coat, fastening means disposed both interiorly and exteriorly of the coat and coacting fastening means carried by said flexible waterproof sheet of material and engageable with the aforesaid fastening means for maintaining the flexible waterproof sheet of material in a position interiorly of the coat or in a position exteriorly of the coat, the exposed portion of said flexible waterproof sheet of material being contrastingly colored with respect to the color of the coat and constituting a signal to identify the wearer.

7. Apparel of the class described comprising a coat having a back and shoulder portion and having a flexible waterproof sheet of material substantially conforming with the width of the back portion of the coat and connected to the bottom edge of the back portion of the coat and adapted to pendently hang therefrom, said sheet of material having such length that when the sheet of material is folded either interiorly or exteriorly of the back portion of the coat the sheet of material extends substantially to the shoulder portions of the coat, said flexible sheet of material having a pair of spaced button-engaging means adjacent the peripheral edge thereof, and spaced buttons carried by said coat adjacent the shoulder portion thereof, both interiorly and exteriorly of the coat, the button-engaging means on said flexible sheet of material being adapted to be fastened to the buttons, either interiorly or exteriorly of the back portion of the coat.

CLAUDE H. DUTROW.

REFERENCES CITED

The following references are of record in the file of this patent:

UNITED STATES PATENTS

| Number | Name | Date |
| --- | --- | --- |
| 1,073,479 | Dunbar et al. | Sept. 16, 1913 |
| 1,773,442 | Speh | Aug. 19, 1930 |
| 1,905,235 | Mandelert | Apr. 25, 1933 |